(12) United States Patent
Ling et al.

(10) Patent No.: US 6,574,061 B1
(45) Date of Patent: Jun. 3, 2003

(54) METHOD AND APPARATUS FOR RUN-TIME TEMPERATURE COMPENSATION OF GIANT MAGNETORESISTIVE HEAD BIAS CURRENT

(75) Inventors: Khong Mau Ling, Singapore (SG); Lian Chong Kwek, Singapore (SG); Kwee Teck Say, Singapore (SG); Myint Ngwe, Singapore (SG); Kah Liang Gan, Singapore (SG); Beng Wee Quak, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 424 days.

(21) Appl. No.: 09/610,202

(22) Filed: Jul. 3, 2000

Related U.S. Application Data

(60) Provisional application No. 60/151,201, filed on Aug. 27, 1999.

(51) Int. Cl.$^7$ ................................................ G11B 5/03
(52) U.S. Cl. .................................... 360/66; 360/31
(58) Field of Search .......................... 360/66, 67, 46, 360/31, 97.02, 77.08, 78.14; 702/132, 130

(56) References Cited

U.S. PATENT DOCUMENTS

| | | |
|---|---|---|
| 3,979,775 A | 9/1976 | Schwarz |
| 4,075,671 A | 2/1978 | Cheatham et al. |
| 4,191,977 A | 3/1980 | Lewkowicz |
| 4,405,961 A | 9/1983 | Chow et al. |
| 4,492,997 A | 1/1985 | Arai et al. |
| 4,506,220 A | 3/1985 | Sawada et al. |
| 4,603,365 A | 7/1986 | Nakamura |
| 5,103,353 A | 4/1992 | Jove et al. |
| 5,260,653 A | 11/1993 | Smith et al. |
| 5,283,521 A | 2/1994 | Ottesen et al. |
| 5,301,080 A | 4/1994 | Ottesen et al. |
| 5,327,298 A | 7/1994 | Ottesen et al. |
| 5,331,492 A | 7/1994 | Komai et al. |
| 5,412,518 A | 5/1995 | Christner et al. |
| 5,426,542 A | 6/1995 | Smith |
| 5,455,717 A | 10/1995 | Van Doorn et al. |
| 5,465,183 A | 11/1995 | Hattori |
| 5,469,305 A | 11/1995 | Madsen et al. |
| 5,473,486 A | 12/1995 | Nepela et al. |
| 5,576,906 A | 11/1996 | Fisher et al. |
| 5,583,727 A | 12/1996 | Parkin |
| 5,585,986 A | 12/1996 | Parkin |
| 5,606,470 A | 2/1997 | Shioya et al. |
| 5,717,536 A | 2/1998 | Jung et al. |
| 5,737,157 A | 4/1998 | Gill |
| 5,771,141 A | 6/1998 | Ohtsuka et al. |
| 5,917,680 A | 6/1999 | Valstyn et al. |
| 5,978,163 A | 11/1999 | Cunningham |
| 5,986,839 A | 11/1999 | Klaassen et al. |
| 6,078,455 A * | 6/2000 | Enarson et al. ............... 360/68 |
| 6,124,998 A * | 9/2000 | Kanegae ..................... 360/68 |
| 6,262,858 B1 * | 7/2001 | Sugiyama et al. ........... 360/66 |

* cited by examiner

Primary Examiner—Alan T. Faber
(74) Attorney, Agent, or Firm—Westman, Champlin & Kelly, P.A.

(57) ABSTRACT

A process of run-time temperature compensating bias current to a magnetoresistive read head in which a plurality of temperature ranges are defined with associated bias current values. A hysteresis range of temperatures is defined for each boundary between temperature ranges. A bias current value is selected based on the temperature range of the sensed temperature. The process is repeated. If the sensed temperature is in a different temperature range from that previously identified and the measured temperature is not in a hysteresis range at the boundary with the temperature range previously identified, the selected bias current value is based on the presently identified temperature range. If the sensed temperature is in a hysteresis range at the boundary with the temperature range previously.

14 Claims, 7 Drawing Sheets

METHOD AND APPARATUS FOR RUN-TIME TEMPERATURE COMPENSATION OF GIANT MAGNETORESISTIVE HEAD BIAS CURRENT

CROSS-REFERENCE TO CO-PENDING APPLICATION

This application claims benefit of Provisional Application No. 60/151,201 filed Aug. 27, 1999 for "Run-Time Temperature Compensation of GMR Head Bias Current" by Khong Mau Ling, Lian Chong Kwek, Kwee Teck Say, Myint Ngwe, Kah Liang Gan and Beng Wee Quak.

FIELD OF THE INVENTION

This invention relates to compensation of the bias current to a giant magnetoresistive (GMR) head, and particularly to a method and apparatus for measuring temperature within a magnetic disc drive and compensating the bias current based on the temperature.

BACKGROUND OF THE INVENTION

Magnetic disc drives employ giant magnetoresistive (GMR) heads to detect data recorded on magnetic discs confronting the heads. More particularly, variations in the magnetic field representing data alter the resistance of the GMR head field as the disc moves past the head. Application of a bias current to the GMR element generates a voltage across the head that varies in accordance with the changing magnetic field. This changing voltage is presented to a read recovery circuit. For a given bias current, the voltage value is based on the resistance of the GMR element. Hence, fluctuations in the voltage value, representing data, are dependent upon fluctuations of the GMR resistance value. While the read voltage generated by the GMR head is independent of the velocity of the disc medium, it is dependent upon the quality of data written on the disc and the fly height of the GMR head, both of which are dependent on the temperature of the disc drive.

Disc drive manufacturers employ a fixed bias current to the GMR head to produce the sense voltage to the read and servo circuits. The bias current is selected during manufacture and is fixed over the entire operating range of the disc drive. At cold temperatures, below about 18° C., the GMR head tends to fly higher (more distant) from the disc, thereby detecting less magnetic flux due to data on the disc. As a result, the voltage due to data produced by the head is smaller at lower temperatures than at higher temperatures (above about 46° C.). Moreover, the write head of the disc drive does not overwrite prior data or write transition parameters as well as at lower temperatures as at higher temperatures. Consequently, the quality of write transition parameters and overwrite is not as good when written at low temperatures as when written at warmer temperatures.

At higher operating temperatures of the disc drive (above about 46° C.), there is a risk of overheating the GMR element. This is because power is not as easily dissipated at higher temperatures as at lower temperatures, leading to overheating of the head. Moreover, at higher temperatures, the head tends to "fly" lower (closer to the disc), thereby detecting more magnetic flux, tending to increase head resistance and leading to greater heating of the GMR element. Thus, there is a risk of overheating the GMR element at higher temperatures, resulting in a lower life span for the head.

The present invention is directed to a technique for run time temperature compensation of the bias current for a magnetoresistive head. Particularly, the present invention operates the head with a higher bias current at cold temperatures and a lower bias current at warmer temperatures.

SUMMARY OF THE INVENTION

In one embodiment of the invention, a method of run-time temperature compensating bias current to a magnetoresistive read head of a disc drive is provided. Temperature within the drive is sensed, and periodically an analog-to-digital converter of the recovery circuit derives a digital representation of the temperature within the disc drive. A bias current value is identified, based on the representation of temperature. The bias current source is set to the identified bias current value.

In one form of the invention, the bias current value is identified by defining a plurality of temperature ranges for temperature within the disc drive, and a bias current value for each temperature range. A hysteresis range of temperatures is defined for each boundary between temperature ranges. A repetitive process measures temperature within the disc drive and identifies the temperature range in which the drive is operating. The bias current is set based on either the identified temperature range if the measured temperature is not in a hysteresis range, or the bias current value previously set if the measured temperature is in a hysteresis range.

In another embodiment of the invention, a disc drive has a housing containing a disc for storing data, a magnetoresistive read head responsive to stored data to supply analog read signals representing the stored data, a temperature sensor for supplying an analog temperature signal representing temperature in the housing; and a read recovery circuit connected to the head. The read recovery circuit includes an analog-to-digital converter for converting the analog read signals to digital read signals. An interrupt processor periodically couples the temperature sensor to the analog-to-digital converter to derive a digital representation of the temperature within the disc drive. A table contains digital representations of bias current values corresponding to temperature ranges. A bias current value is selected from the table corresponding to the temperature within the disc drive. A source of bias current is responsive to the selector to supply bias current to the head having a value selected by the selector.

In one form of the apparatus, the interrupt processor operates the analog-to-digital converter to update temperature measurements when the head confronts a selected servo wedge and upon a predetermined number of revolutions of the disc. In one form, the interrupt processor initiates temperature measurement update once each 256 revolutions of the disc (about 2.84 seconds for a 5,400 rpm disc).

DETAILED DESCRIPTION OF ILLUSTRATIVE EMBODIMENTS

The transfer characteristics of magnetoresistive (MR) heads are based on the relationship of $\Delta V = I_{bias} \cdot \Delta R_{mr}$. Thus, the voltage across the head varies directly with the resistance of the MR element ($\Delta V \approx \Delta R_{mr}$). However, the linearity of this relationship over a range of bias currents is limited, so most bias circuits are designed to provide bias currents that operate the head in the linear transfer range of the head. It is known that giant magnetoresistive (GMR) heads have a larger linear transfer range, and hence are less susceptible to asymmetry at higher bias currents, than standard MR heads. Hence, the voltage due to bias (Vbias) linearly varies with bias current for a given GMR head resistance (Vbias=Ibias·Rgmr).

Figure 1:
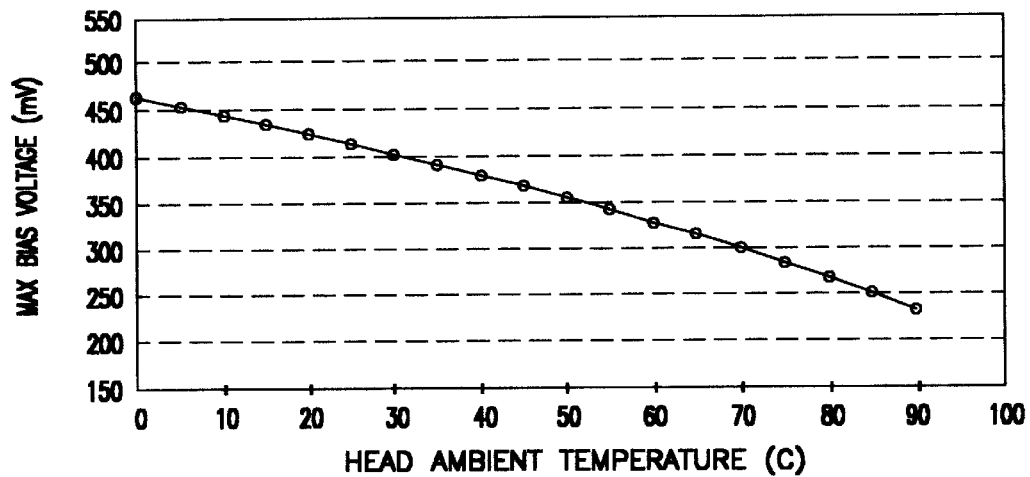
FIG. 1 is a graph illustrating variation of the maximum bias voltage over the operating temperature range of a giant magnetoresistive head.

The maximum bias voltage (Vmax) to which a head may be subjected without overheating varies substantially linearly over the operating temperature of the head. FIG. 1 illustrates the variation of the maximum permitted bias voltage at ambient temperatures between 0° C. and 90° C. for a GMR head commercially available from Seagate Technology LLC, the GMR head having a maximum bias voltage rating of 330 mV at 60° C. As shown in FIG. 1, while the maximum bias voltage is 330 mV at 60° C., the maximum permitted bias voltage is as high as about 470 mV at 0° C. and as low as about 230 mV at 90° C. The present invention takes advantage of this phenomenon, and provides run-time temperature compensation of the bias current for the MR head.

Figure 2:
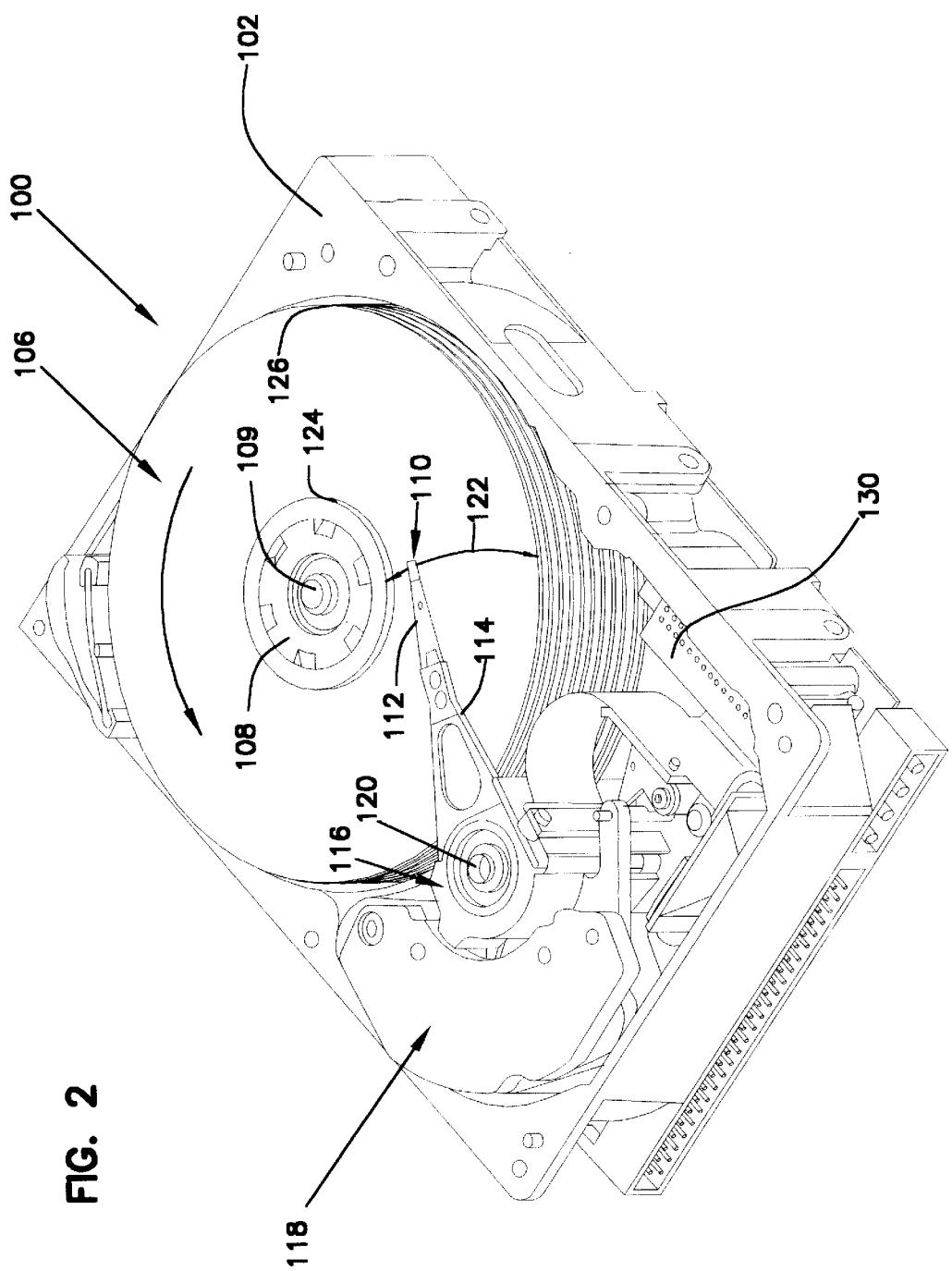
FIG. 2 is a perspective view of a disc drive in which aspects of the present invention may be practiced.

FIG. 2 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head-slider 110 that is mounted to disc drive 100 for communication with the confronting disc surface. Head-slider 110 includes a slider structure arranged to fly above the associated disc surface of an individual disc of disc pack 106, and a transducing head arranged to write data to, and read data from, concentric tracks on the confronting disc surface. In the example shown in FIG. 2, head-sliders 110 are supported by suspensions 112 which are in turn attached to track accessing arms 114 of an actuator 116. Actuator 116 is driven by a voice coil motor (VCM), shown generally at 118. Voice coil motor 118 rotates actuator 116 with its attached heads 110 about a pivot shaft 120 to position the heads of head-sliders 110 over a desired data track along an arcuate path 122 between a disc inner diameter 124 and a disc outer diameter 126. Voice coil motor 118 is driven by servo electronics included on circuit board 130 based on signals generated by the heads of head-sliders 110 and a host computer (not shown). Read and write electronics are also included on circuit board 130 to supply signals to the host computer based on data read from disc pack 106 by the read heads of head-sliders 110, and to supply write signals to the write head of head-sliders 110 to write data to the discs.

Figure 3:
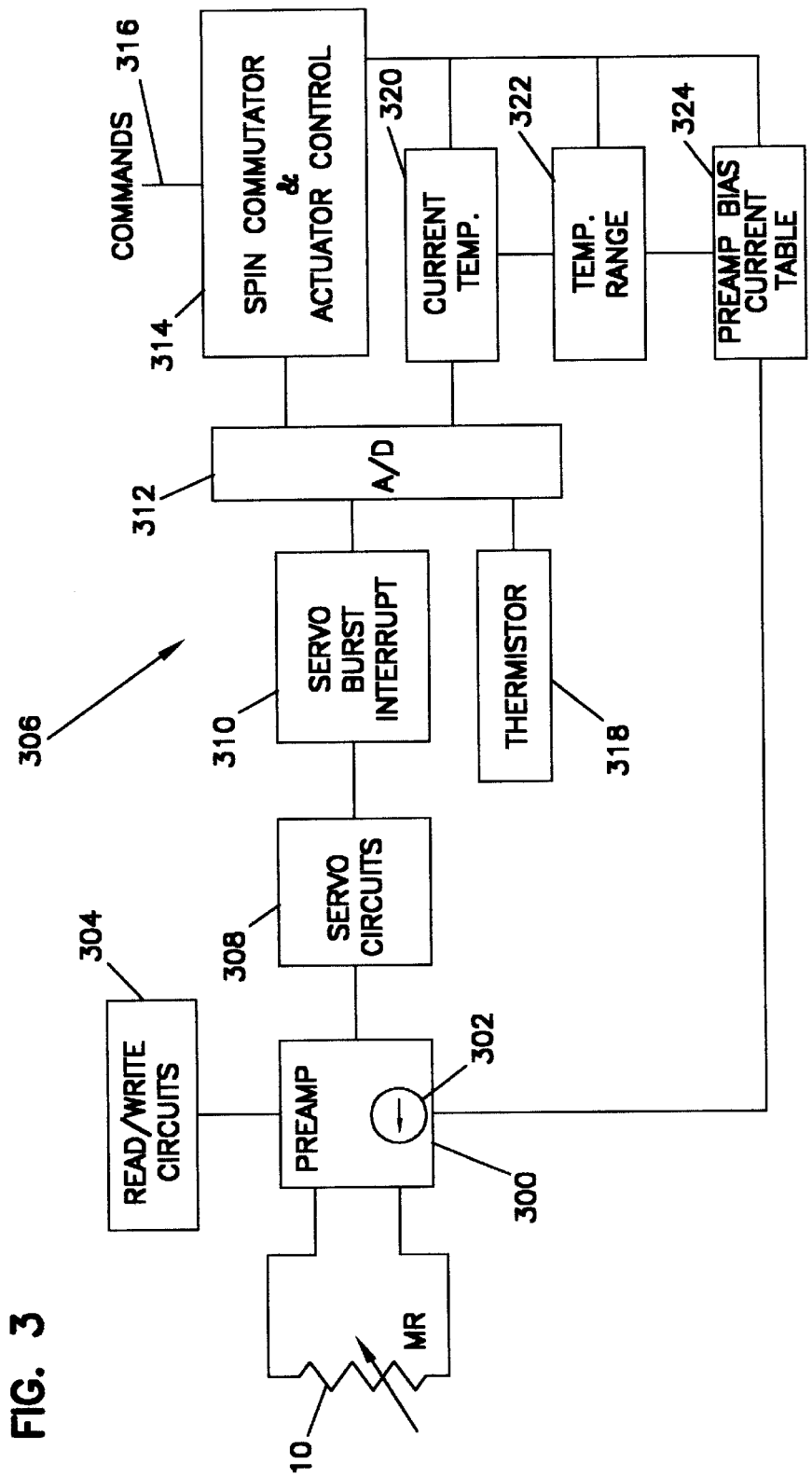
FIG. 3 is a block diagram of one embodiment of a circuit for run-time temperature compensation of bias current for a giant magnetoresistive head according to the present invention.

FIG. 3 is a block circuit diagram of one embodiment of the circuit for run-time temperature compensation of the bias current for head 110. Head 110 is connected to circuit board 130 (FIG. 2) that includes preamplifier 300. Preamplifier 300 includes current source 302 to supply bias current to head 110. As the resistance of head 110 changes due to data read from respective tracks 200, 202 of disc 106 (FIG. 4), an analog signal is generated in preamplifier 300 representative of the read data. Preamplifier 300 supplies analog signals representative of user data to read/write circuits 304, and supplies analog servo data to servo system 306. The read portion of read/write circuits 304 recover user data from the user data signals for processing by a computer (not shown). Servo system 306 receives analog servo data signals from preamplifier 300 through servo circuit 308. Servo burst interrupt 310 provides the analog signals to analog-to-digital converter 312 which supplies digital representations of the servo signals to spin commutation and actuator control 314. Control 314 receives commands from a computer (not shown) through input 316 to perform various servo operations to control operation of voice coil motor 118 and the spindle motor that rotates disc 106 (FIG. 2) in a well-known manner. For example, control 314 operates voice coil motor 118 to control such functions as track seeking and track following and operates the spindle motor to control rotational velocity of discs 106.

In a typical configuration, servo system 306 is included in a servo controller unit that is independent of the disc drive housing. In accordance with the present invention, thermistor 318 is mounted to circuit board 130 within the base 102 of the disc drive housing and is coupled to an input of analog-to-digital converter 312. Alternatively, a separate temperature sensor may be mounted within the disc drive and coupled to converter 312. Current temperature register 320 is coupled to an output of analog-to-digital converter 312 and provides an input to temperature range converter 322. Temperature range converter 322 includes a control input from control 314, and provides a pointer output to preamplifier bias current table 324.

In one preferred form of the servo system, the analog-to-digital converter comprises four distinct analog-to-digital converters, each capable of generating digital signals based on analog signals from preamplifier 300. The four converters are capable of processing four analog signals, such as the A, B, C, D peak signals used for servo control, as well known in the art. In one exemplary disc drive, these four distinct converters receive sixteen inputs, fourteen of which are servo-specific to control functions of control 316 and two of which are for general applications. FIG. 3 illustrates one of the general inputs from thermistor 318.

Servo circuit 308 detects the servo frequencies of the analog signals provided by preamplifier 300. Servo wedges 212 (FIG. 4) on each track of disc 106 contain servo data, and at least one of wedges 212 is selected by interrupt 310 to operate analog-to-digital converter 312 to convert the analog temperature signal from thermistor 318 to a digital signal. More particularly, interrupt 310 operates the converter 312 to convert the analog temperature signal from thermistor 318 when a selected one of the servo wedges 212 confronts read head 110 during each $256^{th}$ revolution of the disc. Converter 312 converts the analog temperature signals to digital temperature signals and for storage in current temperature register 320. Temperature range converter 322 reads the digital representation of temperature in register 320 to select the temperature range, which includes the current temperature. Bias current table 324 is a lookup table containing bias current values for head 110 based on various operating conditions of the head as controlled by actuator control 314. In accordance with the present invention, the bias current is, at least in part, selected on the basis of the temperature range of the temperature sensed by thermistor 318. The signal from converter 322 serves as a pointer to table 324 to select a bias current value. The bias current value selection is supplied to current source 302 to control the magnitude of the bias current provided by the current source to head 110. Thus, the value of the bias current provided by source 302 is based upon the temperature sensed by thermistor 318.

Figure 4:
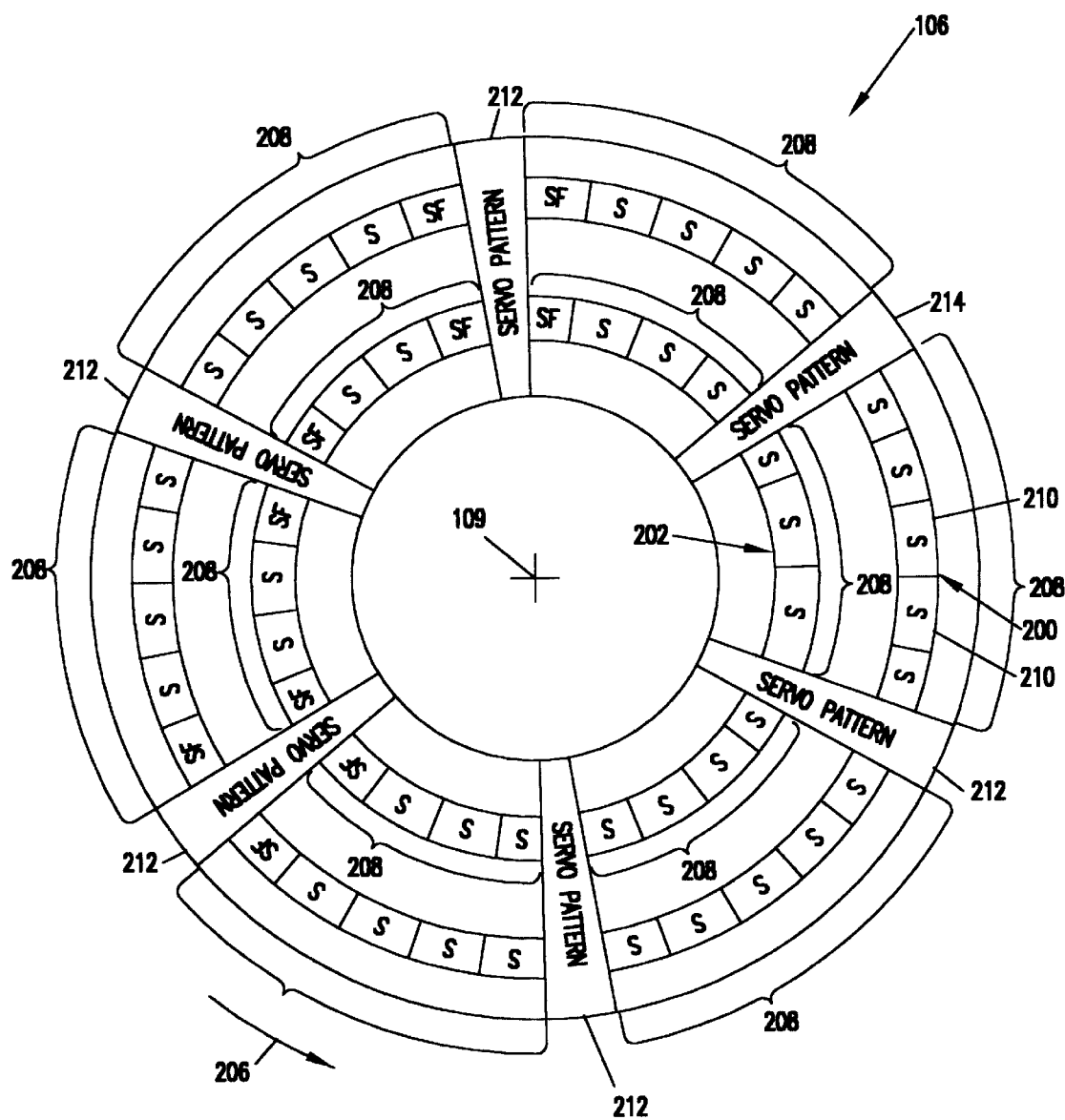
FIG. 4 is a plan view of a disc illustrating the layout of servo and user data on tracks on the disc.

FIG. 4 illustrates the layout of data sector wedges and servo patterns of an embedded servo disc. As shown in FIG. 4, disc 106 contains a plurality of tracks 200, 202 and is rotated in the direction 204 about axis 109. Each track, 200, 202, is segmented into a plurality of data wedges 208, with each wedge containing a plurality of data sectors 210. Each track also contains a plurality of servo pattern wedges 212. As is well known, servo patterns 212 are usually evenly arranged along tracks 200, 202. Also typically, the servo pattern 212 is recorded at a different frequency than the data frequency of data sectors 210. For example, data sectors 210 are recorded at a data frequency that is usually much higher than servo patterns 212. Data sectors 210 contain user data; servo wedges 212 provide servo data to servo system 156 for servo controls, such as for track seeking, track following and disc velocity, as is well known in the art.

Zone bit recording is also a well known recording technique wherein user data are recorded at frequencies based on the geographic position of the track. More particularly, user data on outer tracks, such as track 200, are recorded at a higher frequency than user data on inner tracks such as track 202. With zone bit recording, the disc is segmented into radial zones with all of the tracks in a given radial zone being recorded at the same data frequency. Usually, each of the tracks has the same number of servo wedges 212, positioned like spokes on a wheel. Where the track layout is such that a given number of data sectors do not exactly fit in a data wedge 208, some data sectors may be fragmented so that a fragment SF of a given sector may appear in successive data wedges, separated by the servo wedge. The disc layout illustrated in FIG. 4 is well known in the art.

Servo data are recorded in each servo wedge and are used for various servo control functions. According to the present invention, interrupt 310 periodically controls analog-to-digital converter 312 to convert the analog temperature signal from thermistor 318 to a digital signal for storage in register 320 during a selected data wedge 214. More particularly, upon each $256^{th}$ revolution of disc 106, interrupt 310 interrupts servo operation of the system during one servo wedge 214 and operates converter 312 to convert the analog temperature representation from thermistor 318 to a digital signal for storage in current temperature register 320. Interrupt 310 may identify servo wedge 214 in any of several ways, including counting all of the servo wedges passing head 110 over the 256 revolutions of disc 106, or counting the revolutions by counting a start marker on the track and then counting wedges to the selected wedge. In any case, it is preferred that the temperature update be accomplished only once each 256 revolutions so that critical spin commutation and actuator controls have been performed before interrupting for temperature control. This avoids interrupting critical servo operations. Consequently, for a disc drive operating the disc at 5400 revolutions per minute (rpm), temperature measurement occurs once each 2.84 seconds.

Thermistor 318 may be a temperature sensor already present in the disc drive for other purpose, or it may be uniquely added for selecting bias current as herein described. For example, thermistor 318 may be used to operate read/write circuits 304 to temperature compensate the write current to the write head, and/or to operate servo controls 316 to temperature compensate the drive signal to voice coil motor 118 (FIG. 1) for temperature-adjusted seek and tracking purposes. Employing interrupt 310 with thermistor 318 permits use of the same hardware for various control functions.

Table 324 correlates temperature to bias current value, and selects a bias current value using the digital temperature range signal as an address to the look-up table. Many disc drives include a table of bias current values that permit selection of one of the values during manufacture to optimally tailor bias current to the head. More particularly, variations of head parameters due to manufacturing tolerances usually requires matching of the GMR heads for a given disc drive. However, the operating parameters between disc drives vary, making it common to employ a table of bias current values in each disc drive from which the tuned bias current is selected during manufacture, based on tests performed on the heads at that time. Typically, the bias current table stores bias current values in 0.25 mA increments. Table 324 used in the present invention may be a modified form of such an existing bias current value table to correlate the bias current values to temperature. Table 324 provides bias current value data to current source 302 to reset current source 302 to a new bias current value.

Figure 5:
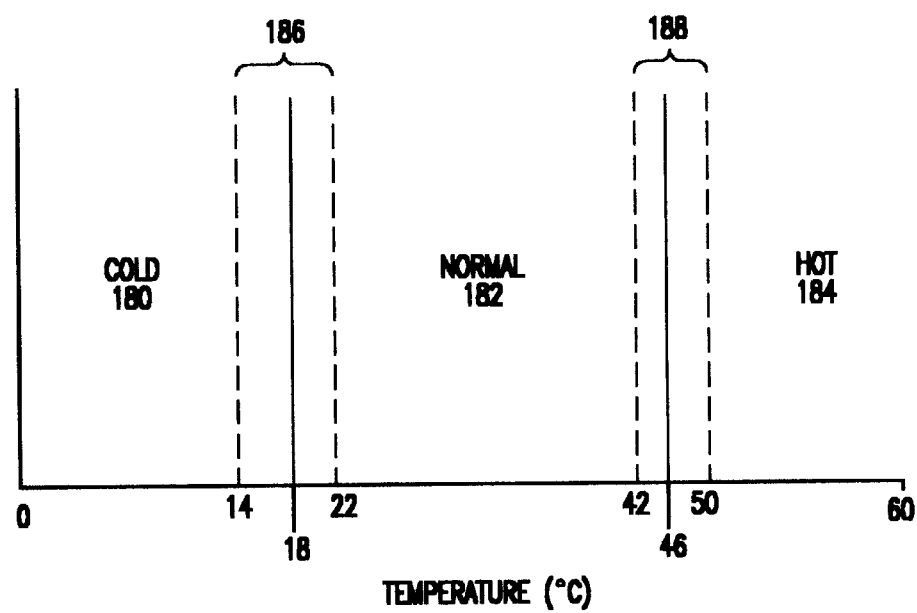
FIG. 5 is a diagram illustrating typical operating temperature ranges of a giant magnetoresistive head.

A digital representation of temperature is stored in register 320 and updated each 2.84 seconds. A temperature range is selected by converter 322. FIG. 5 illustrates typical operating temperature ranges for a typical GMR head, divided between a cold range 180 between about 0° C. and 18° C., a normal range 182 between about 18° C. and 46° C., and a hot range 184 between about 46° C. and 60° C. The resistance of the GMR head varies with the magnetic field due to data on the confronting disc. When the magnetic field affects the head to produce a maximum resistance, a maximum voltage (Vgmrmax) appears across the head due to the fixed bias current. For the exemplary GMR head described above, the resistance is 51.2Ω, so the maximum bias current for the head (for 330 mV operation) is about 6.44 mA. Since table 324 stores bias current values in increments of 0.25 mA, the next incrementally lower bias current value of 6.25 mA is selected for the tuned bias current. Consequently, when GMR head 110 is driven with a 6.25 mA bias current, the actual maximum voltage (Vgmrmax) across the head will be about 320 mV which is within the rated maximum bias voltage.

To avoid damage to the head, it is important that the maximum voltage across the head (which equals the fixed bias current times the maximum resistance of the GMR head) always be less than the maximum permitted bias voltage, which varies with temperature (Vgmrmax<Vmax). When the head is operating in the normal temperature range (18° C. to 46° C.), the maximum bias voltage (Vmax) to which the head may be subjected varies between about 347 mV and 422 mV (see FIG. 1). With the actual maximum voltage across the head at 320 mV, the actual maximum voltage (Vgmrmax) will be 27 mV to 102 mV below the maximum permitted bias voltage (Vmax) to which the head may be subjected, in the normal temperature range. In the cold region, between about 0° C. and 18° C., without compensation, the actual maximum voltage will be 102 mV to 150 mV below the maximum permitted bias voltage; in the hot region, between about 46° C. and 60° C., without compensation, the actual maximum voltage will be 10 mV to 27 mV below the maximum permitted voltage. The present invention compensates the bias current by increasing the actual maximum voltage in the cold region and decreasing the actual maximum voltage in the hot region.

To prevent repeated switching or an unstable condition to setting the bias current, it is preferred that a single bias current be used in each temperature zone of operation (cold, normal and hot). It is also preferred that a hysteresis band be established at each zone boundary so that the bias current value is not changed when the environmental temperature of the disc drive is within the hysteresis band. Thus, FIG. 5 illustrates the three bands, a cold temperature band 180 between 0° C. and 18° C., a normal temperature band 182 between 18° C. and 46° C., and a hot temperature band 184 between 46° C. and 60° C., with hysteresis bands 186 and 188 at the boundaries between 14° C. and 22° C. and between 42° C. and 50° C., respectively. When the temperature sensed by thermistor 318 (FIG. 3) is within a hysteresis band 186 or 188, table 324 does not alter the bias current value of current source 152. For example, if the temperature decreases from normal band 182 to cold band 184, table 324 will not compensate the bias current value until the temperature drops to below 14° C., outside hysteresis band 186. Consequently, if the temperature had dipped into the hysteresis band and subsequently increases back into normal band 182, no change in bias compensation is accomplished. As a result, the hysteresis bands form buffers to prevent repeated oscillations of compensation to the bias current value when the temperature is at or near the boundary temperatures of 18° C. and 46° C.

Figure 6:
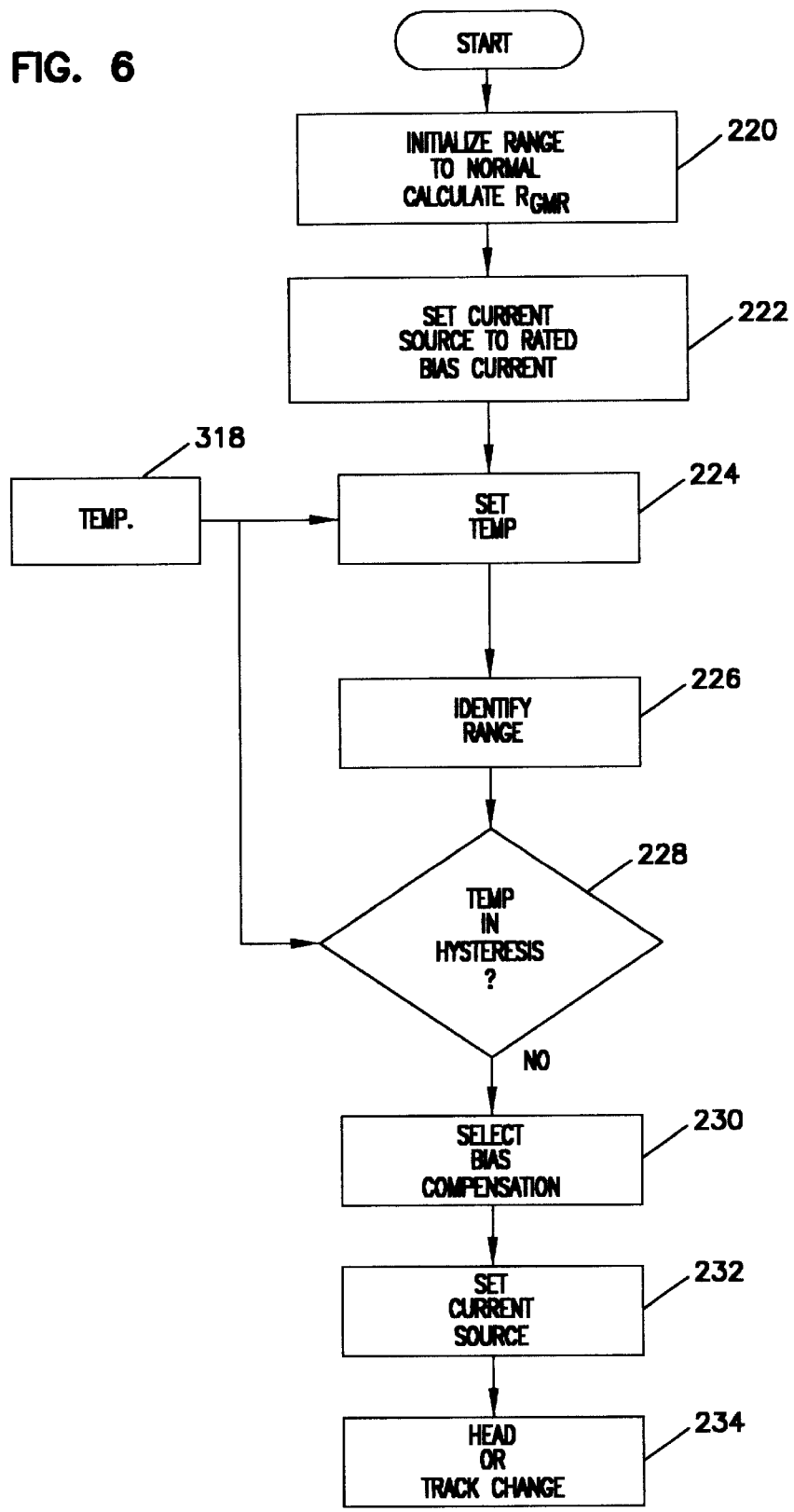
FIG. 6 is a flow diagram illustrating the run-time process of temperature compensating bias current for a giant magnetoresistive head.

FIG. 6 is a flow chart illustrating the steps of the run-time temperature compensation of the bias current for the GMR heads. The process begins at step 220 upon start up of the disc drive. The value in current temperature register 320 is initialized to assume the operating temperature is in the normal operating range (e.g., between 18° C. and 46° C.). The resistance (Rgmr) of the GMR element is measured by applying the rated bias current (Ibais) to the head and measuring the actual bias voltage (Vbias) across the head at preamplifier 300 (FIG. 3). The head resistance (Rgma) is calculated (Vbias/Ibias), which is used in subsequent compensation of the bias current. In the exemplary head 110 described above having a tuned bias current is 6.25 mA, a measured bias voltage of 320 mV indicates the head resistance (Rgma) is 51.2Ω.

At step 222, the bias current value from current source 302 is set to normal for the target head (i.e., that head of the disc drive to be used in the next read operation). Thus, where the rated maximum bias voltage is 330 mV and the head resistance is of current source 302 is set to the normal bias current value (e.g., 6.25 mA) for the rated maximum bias voltage (e.g., 330 mV).

Thermistor 318 continuously senses temperature within the disc drive. After 256 revolutions (2.84 seconds), the current temperature from thermistor 318 is converted to a digital representation and stored in register 320 at step 224. At step 226 the temperature range (FIG. 5) of the measured temperature in register 320 is identified. If the current temperature from thermistor 318 is in the current temperature range (i.e., the normal range between 18° C. and 46° C.), the bias current value will not be updated, and the process waits for the next temperature measurement (e.g., 2.84 seconds later for a 5400 rpm disc). If the present temperature is out of the previously identified range (e.g., not in the normal temperature range), the new range of the present temperature is identified at step 226 from temperature range converter 322.

At step 228, converter 322 also compares the present temperature from thermistor 318 to the hysteresis range between the prior and new ranges to determine if the present temperature is in that hysteresis range. For example, if the previous temperature range was normal range 182 (FIG. 5) and the new range is cold range 180, step 228 determines if the present temperature is between 14° C. and 22° C., in hysteresis range 186. If the temperature is in the hysteresis range, the temperature range identification is not updated and the process returns to a wait for the next operation of the process (256 revolutions later). If the temperature is not in the hysteresis range (e.g., is below 14° C.), the range identification is changed and a new bias compensation will be selected at step 230 from table 324.

It will be appreciated that the temperature compensation process shown in FIG. 6 is performed each 2.84 seconds. However, it is preferred that actual update or change of bias current only be performed during a track seek or head change operation. Consequently, control 314 (FIG. 3) operates table 324 and current source 302 to change the bias current to a new bias current level only when control 314 is performing a track seek operation or is changing the read operation to a different disc of a disc stack. Consequently, setting current source 302 at step 232 is performed only during a track seek or disc/head change. Preferably, the change in bias current is only for the new or target head.

Steps 220 and 222 described above are performed on start-up, preferably for each GMR read head in the disc drive. Consequently, the resistance of each GMR head is measured by applying its rated bias current to the head and measuring the actual bias voltage from the head. With head resistance identified, the initial bias current for each head is established at step 222. Temperature measurement within the disc drive is accomplished each 2.84 seconds (for the 5400 rpm disc) using thermistor 160 operating analog-to-digital converter 312 (FIG. 3) as previously described. Bias current compensation is then performed for the target head using the measured temperature.

The tuned bias current (Ibias$_{tuned}$) is tuned during manufacture for the normal temperature range (between 18° C. and 46° C.) using tuning techniques described in application Ser. No. 09/550,370 filed Apr. 14, 2000 for "Method and Apparatus for Adaptive Tuning Bias Current for Magnetoresistive Head" and assigned to the same assignee as the present invention. To compensate the bias current for temperature, table 324 correlates a correction bias current to be added or subtracted from the tuned bias current based on the head resistance (Rgmr) and the temperature zone (FIG. 5). More particularly, for the cold operating region (between 0° C. and 18° C.) the correction bias current is calculated as 60 mV/Rgmr and is added to the factory tuned bias current. For the hot operating region (between 46° C. and 60° C.) the correction bias current is calculated as 30 mV/Rgmr and is subtracted from the factory tuned bias current.

$$Ibias_{cold} = Ibias_{tuned} + \frac{60 \text{ mV}}{Rgmr}$$

$$Ibias_{hot} = Ibias_{tuned} - \frac{30 \text{ mV}}{Rgmr}$$

Thus in the exemplary head having a head resistance (Rgmr) of 51.2Ω operating in the cold zone, the corrected bias current value will be about 7.42 mA, so the bias current to the head operating in the cold zone (between 0° C. and 18° C.) is the next incremental downward value of 7.25 mA. Thus, the compensated bias current raises the expected voltage level from the head to a level higher than the voltage level in the normal temperature range. Conversely, in the hot zone (between 46° C. and 60° C.), the compensated bias current is calculated at 5.66 mA which results in the next incrementally lower current value of 5.50 mA to reduce the expected voltage level to a level lower than the voltage in the normal temperature zone.

In rare circumstances, the drive might be operating in a given range, such as the cold range 180, with appropriate temperature compensation of the bias current as described, and a rapid rise in temperature might drive the temperature sensed by thermistor 318 to the hysteresis range 188 between normal and hot ranges 182 and 184. Should this occur, step 228 senses that the temperature is in the wrong hysteresis range, and the process continues to steps 230 and 232 to compensate the bias current on the next head or track change, as described. Additionally, at step 228 additional measures might be taken to initiate maintenance or shutdown procedures consistent with such a rapid change in temperature.

Figure 7:
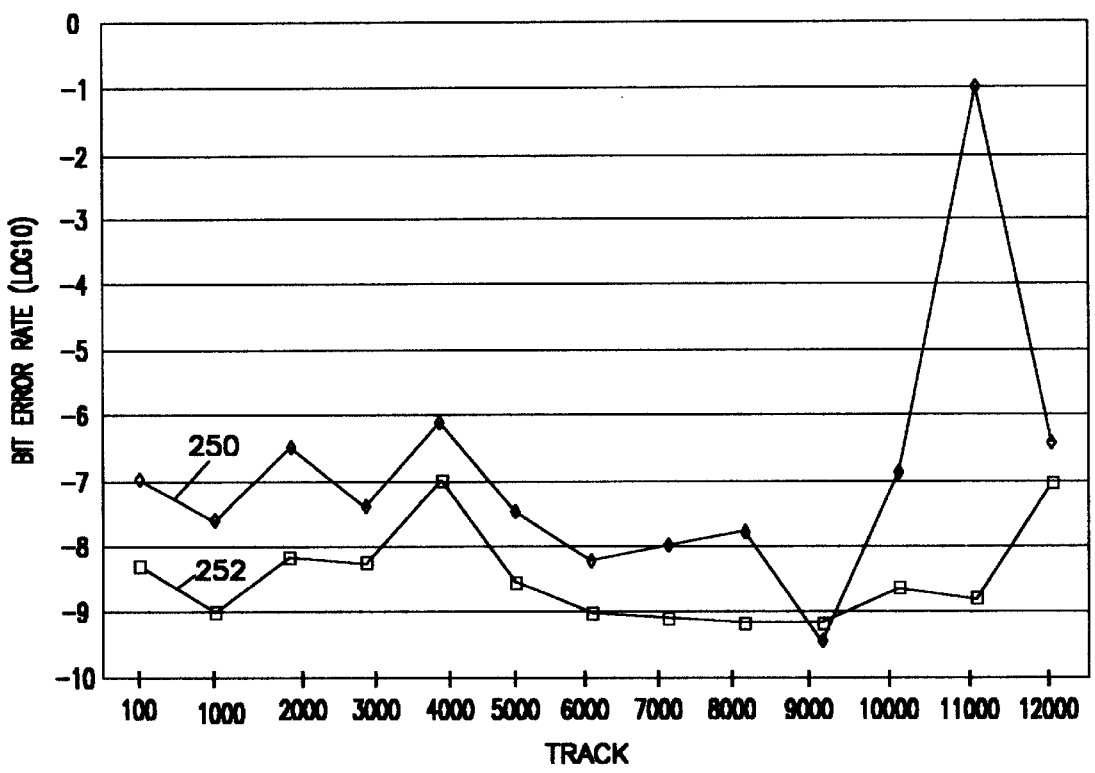
FIGS. 7 and 8 are graphs illustrating the effects of run-time temperature compensation according to the present invention.
Figure 8:
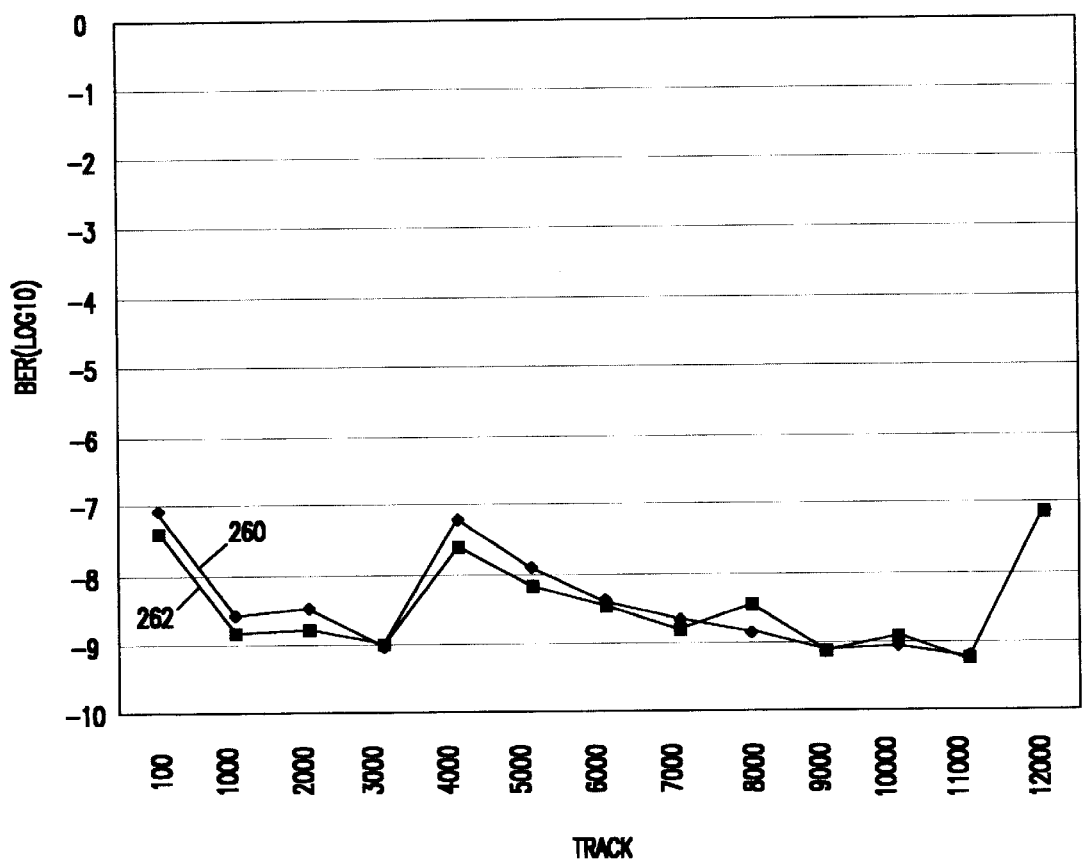

FIGS. 7 and 8 illustrate the effects of the present invention on the bit error rate (BER) during a read operation. In a first set of tests, a disc drive was operated at a temperature of 0° C. with a bias current of 6.25 mA (Vbias of 320 mV) and a bias current of 7.25 mA (Vbias of 370 mV). The bit error rates were measured at various tracks between track 100 and track 12,000 across the disc radius. Graph 250 in FIG. 7 illustrates the bit error rates using a bias current of 6.25 mA without temperature compensation, and graph 252 illustrates the bit error rates using a temperature-compensated bias current of 7.25 mA. More particularly, the bias currents used for the test in graph 252 were derived from a nominal bias current of 6.25 mA and temperature compensated to 7.25 mA. As shown in FIG. 7, the temperature compensated bias current illustrated in curve 252, resulted in lower bit error rates at nearly all locations than the non-compensated bias current illustrated by curve 250. Similarly, FIG. 8 illustrates the results of a second set of tests employing compensated and non-compensated bias currents when the disc drive is operated at a relatively high temperature. More particularly, the disc drive was operated at a temperature of 60° C. with a compensated bias current of 5.5 mA (Vbias of 280 mV) and with an uncompensated bias current of 6.25 mA (Vbias of 320 mV). The bit error rates were measured at various tracks between track 100 and track 12,000 across the disc radius, and the results are illustrated by graphs 260 (uncompensated 6.25 mA bias current) and 262 (compensated 5.5 mA bias current). FIG. 8 illustrates that the disc drive can be operated with a lower compensated bias current at higher temperatures without affecting the bit error rate (BER) of the drive. Consequently, the drive may be operated with lower power, thereby reducing temperature of the drive.

In summary, the present invention provides a process of run-time compensating bias current to magnetoresistive read head 110 of a disc drive 100 that supplies analog signals representing information to a recovery circuit 304, 306 based on the value of a bias current. The recovery circuit includes analog-to-digital converter 312 that converts analog signals received by the recovery circuit to digital signals. Current source 302 provides bias current to the head. Thermistor 318 senses temperature within the disc drive, and analog-to-digital converter 312 is periodically operated to derive a digital representation of the temperature within the disc drive. Temperature range converter 322 is responsive to the digital representation of temperature to identify a bias current value in table 324 to set the value of bias current supplied by bias current source 302 to the identified bias current value.

The compensation of the bias current is identified by defining a plurality of temperature ranges 180, 182, 184 for temperature within the disc drive, and a bias current value for each range in table 324. A hysteresis range 186, 188 of temperatures is defined for each boundary between temperature ranges. An initial bias current value is set based on one of the temperature ranges. The temperature within the disc drive is repeatedly measured by thermistor 318 and the temperature range containing the measured temperature is identified (226). Additionally, it is determined (228) if the measured temperature is in a hysteresis range. The bias current value is set (232) based on (a) the identified temperature range if the measured temperature is not in a hysteresis range, or (b) the bias current previously set if the measured temperature is in a hysteresis range.

The disc drive 100 has a housing 102 containing a disc 106 for storing data. A magnetoresistive read head 110 is responsive to stored data to supply analog read signals representing the stored data. Thermistor 318 supplies an analog temperature signal representing temperature in the housing. A read recovery circuit 304, 306 is connected to the head. The read recovery circuit includes an analog-to-digital converter 312 for converting the analog read signals to digital read signals. An interrupt processor 310 connects thermistor 318 to analog-to-digital converter 312 to derive a digital representation of the temperature within the disc drive. A table 324 contains digital representations of temperature values and corresponding representations of bias current values. The table selects a bias current value from the table corresponding to the temperature within the disc drive, and bias current source 302 supplies bias current to the head having a value selected by the table.

Temperature range converter 322 points into table 324 to select the bias current therefrom. If the measured temperature is in a hysteresis range, the bias current value from table 324 is based on the identified temperature range. If the measured temperature is in the hysteresis range, the bias current value is that previously set.

Although the present invention has been described with reference to disc drives employing embedded servo technology, those skilled in the art will recognize that the present invention may be practiced in disc drives that employ dedicated servo technology. More particularly, instead of reading servo data and interrupts from a servo sector on an embedded servo disc, the servo data and interrupts might recorded on and read from a dedicated servo surface on one of the disc of disc pack 106.

While the present invention has been described in conjunction with a giant magnetoresistive heads having a tuned bias current of 5.5 mA, a rated bias voltage of 300 mV, and resistances of 54.5 and 45.5Ω, the principles of the present invention are applicable to heads with other electrical parameters without departing from the spirit and scope of the present invention. Moreover, while the invention is described using table parameters for bias compensation that are added to or subtracted from the tuned bias current, the table might contain representations of the adjusted bias currents in substitution of the tuned bias current, rather than summing with the tuned bias current.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, particular elements may vary depending on the particular application for the bias current compensation while maintaining substantially the same functionality without departing from the scope and spirit of the present invention. In addition, although the preferred embodiment described herein is directed to a run-time temperature compensation of bias current for a GMR head system using embedded servo technology, it will be appreciated by those skilled in the art that the teachings of the present invention can be applied to other systems, such as ordinary MR heads (AMR) or systems employing dedicated servo technology, without departing from the scope and spirit of the invention.

What is claimed is:

1. A process of run-time compensating bias current to a magnetoresistive read head that employs bias current to read information from a rotating recording disc and supplies analog signals representing information to a recovery circuit, the recovery circuit including an analog-to-digital converter to convert analog signals received by the recovery circuit to digital signals, the method comprising steps of:
    (A) providing a source of bias current to the head;
    (B) sensing a temperature within the disc drive using a temperature sensor in the disc drive, and
    (C) operating the analog-to-digital converter in response to a predetermined number of rotations of the disc to derive a digital representation of the sensed temperature within the disc drive;
    (D) identifying a bias current value based on the representation of temperature; and
    (E) setting the bias current value supplied by the bias current source to the identified bias current value.

2. The process of claim 1, wherein step (E) is performed by steps of:
    (i) defining a plurality of temperature ranges for temperature within the disc drive;
    (ii) defining a bias current value for each temperature range;
    (iii) setting an initial bias current value based on one of the temperature ranges; and
    (iv) measuring temperature within the disc drive;
    (v) identifying the temperature range containing the measured temperature;
    (vi) setting the bias current value; and
    (vii) repeating steps (iv) through (vi).

3. The process of claim 2, further including a step of:
    (F) defining a hysteresis range of temperatures for each boundary between temperature ranges,
    wherein step (E) further includes a step of:
    (viii) identifying if the measured temperature is in a hysteresis range, and wherein during repetitions of step (v), step (v) is performed by steps of:
        (a) setting the bias current value to the defined bias current value for the identified temperature range if the measured temperature is not in a hysteresis range, or
        (b) setting the bias current value to the bias current value next previously set if the measured temperature is in a hysteresis range.

4. The process of claim 2, wherein the information stored on the disc is arranged in a plurality of tracks each containing a plurality of servo wedges and a plurality of data segments, wherein step (C) includes:
    (ix) counting N rotations of the disc,
    (x) identifying a selected servo wedge confronting the head during the Nth rotation, and
    (xi) operating the analog-to-digital converter to derive a digital representation of the sensed temperature within the disc drive when the head confronts the selected servo wedge during the Nth rotation.

5. The process of claim 1, wherein the information stored on the disc is arranged in a plurality of tracks each containing a plurality of servo wedges and a plurality of data segments, wherein step (C) includes:
    (ix) counting N rotations of the disc,
    (x) identifying a selected servo wedge confronting the head during the Nth rotation, and
    (xi) operating the analog-to-digital converter to derive a digital representation of the sensed temperature within the disc drive when the head confronts the selected servo wedge during the Nth rotation.

6. The process of claim 5, further including a step of:
    (G) defining a plurality of temperature ranges for temperature within the disc drive,
    and wherein step (E) comprises:
    (i) defining a bias current value for each temperature range,
    (ii) identifying the temperature range containing the sensed temperature within the disc drive, and
    (iii) selecting a compensation value based on the identified temperature range.

7. The process of claim 6, wherein step (E) further comprises:
    (iv) adjusting the bias current value of the source of bias current based on the selected compensation value.

8. The process of claim 7, further including steps of:
    (H) defining a hysteresis range at a boundary between temperature ranges, each hysteresis range including temperature values from the temperature ranges on both sides of the boundary, and
    and step (iii) further comprises the step of:
    (iv) setting the compensation value to that of the temperature range next previously identified if the sensed temperature within the disc drive is in a hysteresis range.

9. The process of claim 1, further including a step of:
    (J) defining a plurality of temperature ranges for temperature within the disc drive,
    and wherein step (E) comprises:
    (i) defining a bias current value for each temperature range,
    (ii) identifying the temperature range containing the sensed temperature within the disc drive, and
    (iii) selecting a compensation value based on the identified temperature range.

10. The process of claim 9, wherein step (E) further comprises:
    (iv) adjusting the bias current value of the source of bias current based on the selected compensation value.

11. The process of claim 10, further including steps of:
    (H) defining a hysteresis range at a boundary between temperature ranges, each hysteresis range including temperature values from the temperature ranges on both sides of the boundary, and
    (I) repeating step (C),
    and step (iii) further comprises the step of:
    (iv) setting the compensation value to that of a temperature range identified in a prior performance of step (C) if the sensed temperature within the disc drive is in a hysteresis range.

12. A disc drive having:

a housing containing:
- a disc supported in the housing, the disc being rotatable about an axis to store data,
- a magnetoresistive read head responsive to stored data for supplying analog read signals representing the stored data, the analog read signals having a strength based on a bias current, and
- a temperature sensor for supplying an analog temperature signal representing temperature in the housing; and a read recovery circuit connected to the head, the read recovery circuit including:
- an analog-to-digital converter for converting the analog read signals to digital read signals,
- an interrupt processor connected to the analog-to-digital converter and responsive to a predetermined number of rotations of the disc to connect the temperature sensor to the analog-to-digital converter to derive a digital representation of the temperature within the disc drive,
- a table containing digital representations of bias current values,
- a selector responsive to the representations of temperature for selecting a bias current value from the table corresponding to the temperature within the disc drive, and
- a source of bias current responsive to the table for supplying bias current to the head having a value selected by the selector.

13. A disc drive of claim 12, wherein the selector defines (i) a plurality of temperature ranges for temperature within the disc drive and (ii) a hysteresis range of temperatures for each boundary between temperature ranges, and the table defines a bias current value for each temperature range, the selector being responsive to the representation of temperature to identify if the temperature within the disc drive is in a hysteresis range, the table being responsive to the selector identifying a temperature in a hysteresis range to select the bias current value of a previously identified temperature range.

14. A disc drive of claim 13, wherein table is responsive to the selector identifying a temperature range different from the previously identified range and not in a hysteresis range to select a bias current value based on the identified temperature range.

* * * * *